(12) United States Patent
Marom et al.

(10) Patent No.: US 7,262,898 B2
(45) Date of Patent: Aug. 28, 2007

(54) APPARATUS FOR REDUCING DROPS IN A TRANSMISSION SPECTRUM DUE TO INTER-PIXEL GAPS

(75) Inventors: Dan M. Marom, Howell, NJ (US); David Thomas Neilson, Old Bridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 41 days.

(21) Appl. No.: 11/241,830

(22) Filed: Oct. 1, 2005

(65) Prior Publication Data

US 2007/0076284 A1 Apr. 5, 2007

(51) Int. Cl.
*G02F 1/03* (2006.01)
*G02B 27/44* (2006.01)

(52) U.S. Cl. ............... 359/245; 359/259; 359/263; 359/316; 359/318; 359/566; 359/569; 359/572; 359/254; 359/231; 398/81; 398/87; 398/183; 398/201

(58) Field of Classification Search ........ 359/231, 359/245, 254, 259, 263, 316, 318, 566, 569, 359/572; 398/81, 87, 183, 201
See application file for complete search history.

(56) References Cited

U.S. PATENT DOCUMENTS

| 7,019,883 | B2* | 3/2006 | Moon et al. ........... 359/572 |
| 2002/0067887 | A1 | 6/2002 | John |
| 2003/0081308 | A1 | 5/2003 | Wing |
| 2003/0184843 | A1* | 10/2003 | Moon et al. ........... 359/290 |

FOREIGN PATENT DOCUMENTS

WO PCT/US2006/037189 2/2007

* cited by examiner

Primary Examiner—Evelyn A. Lester

(57) ABSTRACT

The invention includes an apparatus for modulating an optical signal. The apparatus includes a modulating mechanism comprising a plurality of modulating component arrays, each modulating component array comprising a plurality of modulating components, wherein adjacent ones of the plurality of modulating components in each modulating component array are separated by gaps, and wherein adjacent ones of the plurality of modulating component arrays are offset along a dispersion direction of an incident optical signal such that the gaps associated with the adjacent ones of the plurality of modulating component arrays are offset. In one embodiment, rows of the modulating components in the modulating component arrays are offset along the dispersion direction of the incident optical signal by a fraction of the modulating component pitch.

20 Claims, 3 Drawing Sheets

200

300

APPARATUS FOR REDUCING DROPS IN A TRANSMISSION SPECTRUM DUE TO INTER-PIXEL GAPS

CROSS-REFERENCE TO RELATED APPLICATIONS

This patent application is related to U.S. patent application entitled "Apparatus For Reducing Drops in a Transmission Spectrum Due to Inter-Pixel Gaps," Ser. No. 11/241,853, filed Oct. 1, 2005, which is herein incorporated by reference in its entirety.

FIELD OF THE INVENTION

The invention relates to the field of communication networks and, more specifically, to optical signal processing.

BACKGROUND OF THE INVENTION

In general, optical components for switching or attenuating selected channels in wavelength division multiplexed (WDM) systems are useful in optical network elements, such as reconfigurable optical add-drop multiplexers (ROADMs). A spatial dispersion module is typically employed in such devices for spatially dispersing optical signals and projecting the spatially dispersed optical signals on a spatial light modulator.

A spatial light modulator for wavelength division multiplexing (WDM) applications is typically comprised of a one-dimensional pixel array for modulating incident optical signals, where each pixel is assigned to a different wavelength channel and the operation of each pixel varies according to the application of the spatial light modulator. For example, a pixel may attenuate an optical signal (e.g., for an optical channel blocker) or switch an optical signal between optical fibers (e.g., for a wavelength selective switch).

In existing spatial light modulators, the one-dimensional pixel array is configured such that there is a finite pixel gap between each pair of adjacent pixels in the one-dimensional pixel array. Furthermore, the one-dimensional pixel array is configured such that each pixel in the one-dimensional pixel array has an associated pixel pitch that matches the system channel spacing (e.g., 100 GHz).

Disadvantageously, however, pixel gaps between pixels in the pixel array produce spectral transmission dips. As such, optical transmission systems utilizing dynamic bandwidth allocation would incur substantial transmission penalties from such spectral transmission dips. Specifically, any signal component present at the location of an inter-pixel gap is distorted from the cumulative effects of amplitude and phase variations at the resulting transmission drops.

SUMMARY OF THE INVENTION

Various deficiencies in the prior art are addressed through the invention of an apparatus for modulating an optical signal. The apparatus includes a modulating mechanism comprising a plurality of modulating components arranged in a plurality of one-dimensional arrays. The plurality of modulating components in each one-dimensional modulating component array are separated by gaps, wherein adjacent rows of the plurality of modulating components are offset along the dispersion direction of an incident optical signal by a fraction of the modulating component.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is discussed in the context of an optical signal processing system; however, the present invention can be readily applied to other optical systems. In general, the present invention includes an apparatus for reducing transmission drops in a modulated transmission spectrum which result from inter-component gaps between adjacent modulating components of a spatial light modulator. The present invention, by reducing transmission drops in a modulated transmission spectrum, increases the smoothness of the modulated transmission spectrum. As such, by smoothing the modulated transmission spectrum, the present invention thereby enables flexible allocation of optical bandwidth. Although referred to herein as a plurality of modulating component arrays, in one embodiment, each modulating component array in the plurality of modulating component arrays is a one-dimensional modulating component array.

In accordance with the present invention, a reduction in transmission drops of a modulated transmission spectrum is achieved using a plurality of modulating component arrays. The modulating component arrays include respective pluralities of modulating components, where adjacent modulating components are separated by associated modulating component gaps. The modulating component arrays are disposed such that respective pluralities of modulating component gaps associated with adjacent modulating component arrays are offset in the dispersion direction of an optical signal incident on the modulating component arrays by a fraction of the modulating component pitch. In one embodiment, modulating component pitch is the width of the modulating component in the spatial dispersion direction. The use of a plurality of modulating component arrays, where the modulating component arrays are offset in the dispersion direction of an incident optical signal, reduces localization of the modulating component gaps on a particular frequency range of an incident optical signal.

Figure 1:
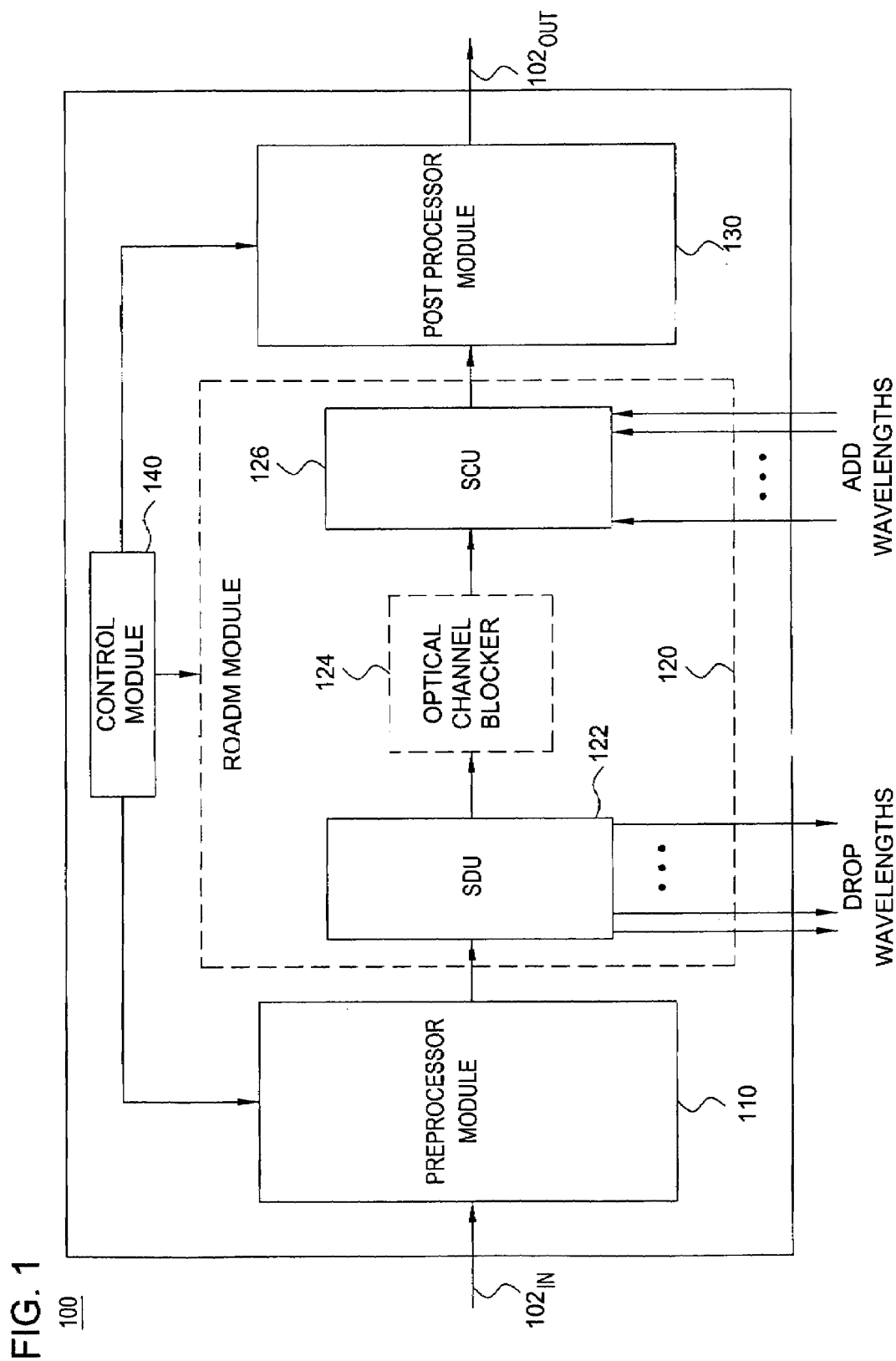
FIG. 1 depicts a high-level block diagram of an optical signal processing system.

FIG. 1 depicts a high-level block diagram of an optical signal processing system. As depicted in FIG. 1, optical signal processing system 100 includes a preprocessor module (PM) 110, a reconfigurable optical add-drop multiplexer (ROADM) 120, a postprocessor module (PM) 130, and a control module (CM) 140. As depicted in FIG. 1, CM 140 communicates with each of PM 110, ROADM 120, and PM 130. As depicted in FIG. 1, CM 140 receives and executes commands adapted for controlling PM 110, ROADM 120, and PM 130. Similarly, as depicted in FIG. 1, CM 140 generates and communicates commands adapted for controlling PM 110, ROADM 120, and PM 130.

As depicted in FIG. 1, PM 110 receives optical signals from an upstream network element (not depicted) via an optical input fiber $102_{IN}$. The PM 110 performs preprocessing of the received optical signals. The PM 110 sends the preprocessed optical signals to ROADM 120. As depicted in FIG. 1, ROADM 120 receives preprocessed optical signals from PM 110. The ROADM 120 performs add-drop switching of the preprocessed optical signals. The ROADM 120 sends the switched optical signals to PM 130. As depicted in FIG. 1, PM 130 receives the switched optical signals from ROADM 120. The PM 130 performs post-processing on the switched optical signals. The PM 130 transmits optical signals towards a downstream network element (not depicted) via an optical output fiber $102_{OUT}$.

As depicted in FIG. 1, PM 110 is operable for performing various optical signal pre-processing functions. For example, PM 110 may include optical power monitoring modules, optical amplifiers, dispersion compensation modules, and like optical signal pre-processing modules. As depicted in FIG. 1, PM 130 is operable for performing various optical signal post-processing functions. For example, PM 130 may include operational amplifiers, optical service channel filters, and like optical signal post-processing modules. Although described with respect to specific functions, those skilled in the art will appreciate that PM 110 and PM 130 may perform various other optical signal processing functions.

As depicted in FIG. 1, ROADM 120 may include a signal distribution unit (SDU) 122, a signal combination unit (SCU) 126, and, optionally, an optical channel blocker (OCB) 124. The SDU 122 receives preprocessed optical signals from PM 110. The SDU 122, which may be either a wavelength selective switch or a passive splitter, drops a first portion of the preprocessed optical signals, and allows a second portion of the preprocessed optical signals to pass through. The optional OCB 124 receives the pass-through optical signals. The optional OCB 124 performs channel blocking functions on the pass-through optical signals. The optional OCB 124 allows at least a portion of the pass-through optical signals to pass through to SCU 126. The SCU 126 receives pass-through optical signals directly from SDU 124, or, optionally, indirectly from SDU 124 via OCB 124. The WSS 126 adds optical signals to the pass-through optical signals to form switched optical signals. The SCU 126, which may either be a wavelength selective switch or a passive combiner, passes the switched optical signals to PM 130.

Although depicted and described with respect to specific functional components of an optical signal processing system, the present invention is not intended to be limited to a specific optical signal processing system configuration. As such, although depicted and described within the context of a particular optical signal processing system, the present invention may be used in various other optical signal processing systems. Furthermore, although explicitly depicted and described with respect to FIG. 1, those skilled in the art will appreciate that spatial light modulators may be used in different components of the optical signal processing system depicted and described with respect to FIG. 1. For example, a spatial light modulator in accordance with the present invention may be used in optical wavelength selective switches, optical channel blockers, and like optical signal processing modules and systems.

In general, a spectral optical processor/switch spatially disperses a received optical signal such that a spatially dispersed optical signal is incident on a spatial light modulator for performing various functions. In one embodiment, for example, a spatial light modulator switches the incident optical signal from an optical input fiber to an optical output fiber (e.g., for a wavelength selective switching device). In one embodiment, for example, a spatial light modulator attenuates the incident optical signal (e.g., for optical channel blockers). In general, a spatial light modulator includes a plurality of modulating components. The spatially dispersed optical signal (i.e., the optical signal spectrum) is incident on at least a portion of the modulating components.

As described herein, each modulating component (e.g., optical pixel) of the present invention is adjustable for modulating (e.g., attenuating, switching, and the like) the portion of the optical signal spectrum incident on that modulating component. The modulating component arrangements for different embodiments of the present invention are depicted and described herein with respect to FIG. 2 (i.e., a modulating mechanism having two arrays of modulating components) and FIG. 3 (i.e., a modulating mechanism having three arrays of modulating components). Although depicted and described with respect to two-array spatial light modulators and three-array spatial light modulators, additional transmission spectrum smoothing may be achieved using spatial light modulators having greater than three arrays of modulating components.

Figure 2:
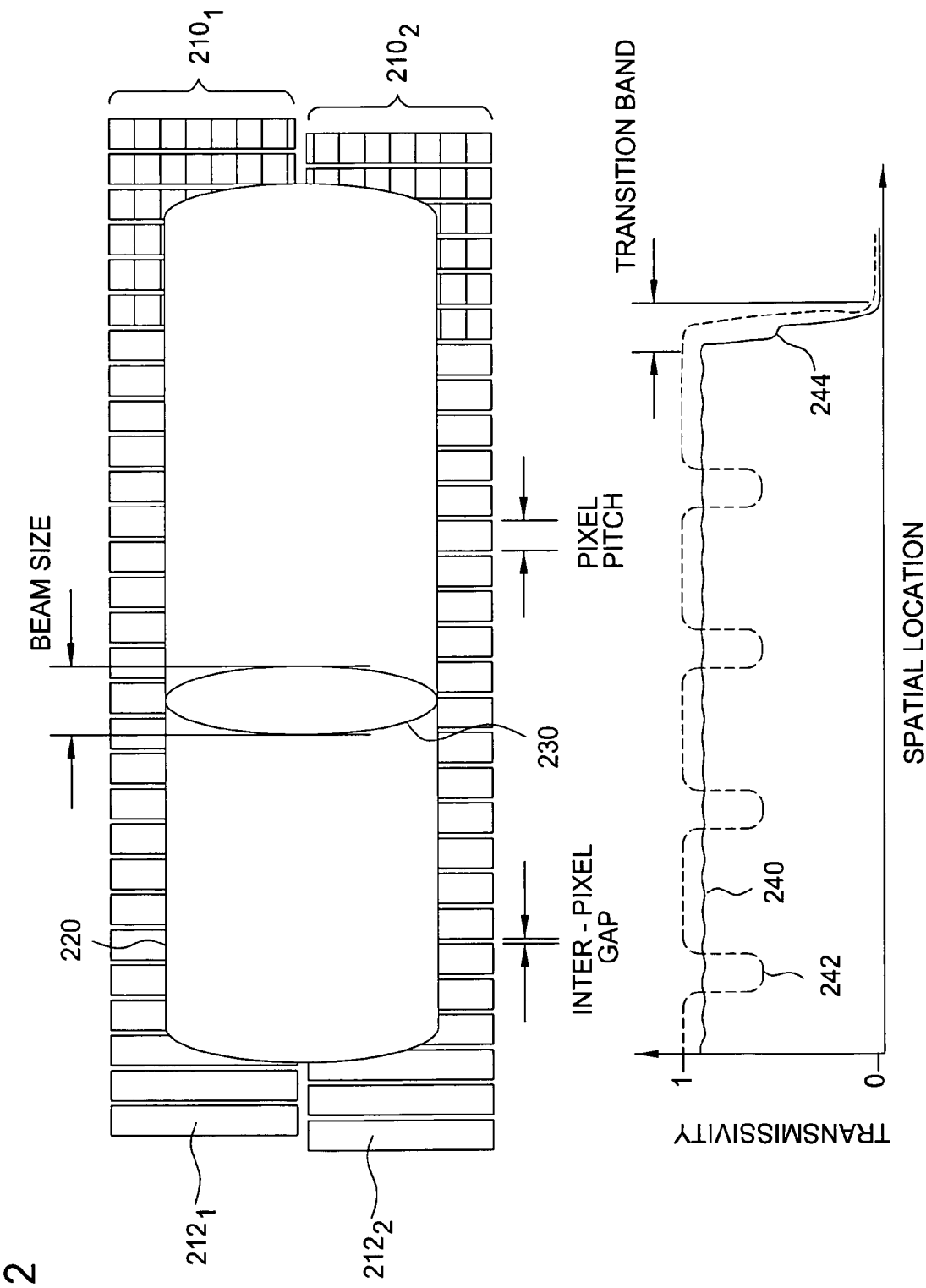
FIG. 2 depicts a spatial light modulator according to one embodiment of the invention.

FIG. 2 depicts a spatial light modulator according to one embodiment of the invention. Specifically, spatial light modulator 200 of FIG. 2 includes a plurality of modulating component arrays $210_1$–$210_2$ (collectively, modulating component arrays 210). The modulating component array $210_1$ (denoted as the first modulating component array $210_1$) includes a plurality of modulating components $212_1$ (collectively, modulating components $212_1$). The modulating component array $210_2$ (denoted as the second modulating component array $210_2$) includes a plurality of modulating components $212_2$ (collectively, modulating components $212_2$). The modulating components $212_1$ and modulating components $212_2$ are collectively denoted as modulating components 212.

As depicted in FIG. 2, a spatially dispersed optical signal 220 is incident upon spatial light modulator 200 such that the dispersed optical spectrum is stretched across a portion of the modulating components 212 of modulating component arrays 210. The dispersion of an optical signal for forming a spatially dispersed optical signal is generally known in the art. In one embodiment, spatial dispersion of an optical signal may be performed using a pair of lenses and a diffraction grating. For example, a received optical signal radiating from an input optical fiber may be collimated by a first lens. In continuation of this example, the collimated optical signal may be incident on a diffraction grating that spatially disperses the received optical signal. The spatially dispersed optical signal may then be directed, using a second lens, such that the dispersed optical signal is incident on a spatial light modulator.

As depicted in FIG. 2, a single-frequency component 230 of spatially dispersed optical signal 220 is incident upon spatial light modulator 200. For any single-frequency component in an optical signal spectrum, the light beam has an elliptical Gaussian shape and a finite size. As depicted in FIG. 2, single-frequency optical signal 230 of spatially dispersed optical signal 220 has an associated beam size. The single-frequency component 230 is incident upon three modulating components $212_1$ and two modulating components $212_2$. Although one single-frequency component 230 of spatially dispersed optical signal 220 is depicted, additional single-frequency optical signals (not depicted) of spatially dispersed optical signal 220 may be incident on other combinations of modulating components 212.

The modulating components $212_1$ in first modulating component array $210_1$ and modulating components $212_2$ in second modulating component array $210_2$ have component pitches. As depicted in FIG. 2, in one embodiment, the component pitches associated with each of the modulating components 212 are equal to or less than a beam size of a single-frequency component 230 of spatially dispersed optical signal 220.

As depicted in FIG. 2, adjacent modulating components in the first modulating component array $210_1$ are separated by inter-component gaps and adjacent modulating components in the second modulating component array $210_2$ are separated by inter-component gaps. The first modulating component array $210_1$ and second modulating component array $210_2$ are offset in the dispersion direction spatially dispersed optical signal 220 such that the inter-component gaps between modulating components $212_1$ of first modulating component array $210_1$ and the inter-component gaps between modulating components $212_2$ of second modulating component array $210_2$ are offset. In one embodiment, modulating components of different arrays are offset by a fraction of the component pitch. The fraction of the component pitch may be half the component pitch, one third of the component pitch, and other fractions of the component pitch.

In accordance with the present invention, spatially dispersed optical signal 220 being incident on spatial light modulator 200 produces a resulting modulated transmission spectrum 240. The modulated transmission spectrum 240 depicts a spectrum in which transmission drops normally associated with existing spatial light modulators (illustratively, transmission drops depicted in modulated transmission spectrum 242) are reduced. In this embodiment, the Gaussian beam mode does not resolve the individual modulating components and transmission drops in the modulated transmission begin to decrease in magnitude.

As described herein, reduction of transmission drops is accompanied by a drop in the transmission level (i.e., transmissivity). In one embodiment, magnitude variations (i.e., ripple) in the modulated transmission spectrum may be reduced by increasing the number of modulating component arrays; however, as the number of modulating component arrays (and, therefore, the passband ripple) is increased, the associated transmission level is reduced. As such, selection of the number of modulating component arrays in accordance with the present invention requires balancing between reduction of transmission drops in the modulated transmission spectrum and reduction of transmissivity of the modulated transmission spectrum.

As depicted in FIG. 2, modulated transmission spectrum 240 is represented according to spatial location (illustratively, on the abscissa) and transmissivity (illustratively, on the ordinate axis). Although the transmissivity of modulated transmission spectrum 240 is less than the transmissivity of modulated transmission spectrum 242, the significant reduction of the transmission drops associated with modulated transmission spectrum 242 significantly outweighs the insignificant reduction in transmissivity (which may be on the order of a one decibel decrease). As such, the present invention enables more efficient optical bandwidth allocation, reduced transmission penalties, and the like.

As depicted in FIG. 2, an activated modulating component is denoted by horizontal hatch lines (illustratively, the rightmost modulating components 212 of each modulating component array 210). The modulated transmission spectrum 240 shows that the transmission spectrum drops significantly for an activated pixel (i.e., the transmission spectrum drops from a high transmission value to a low transmission value over finite bandwidth denoted as a transition band). As depicted in FIG. 2, the transition band associated with modulated transmission spectrum 240 includes a transition point 244 due to offset positions of the modulating components $212_1$ in the first modulating component array $210_1$ and the modulating components $212_2$ in second modulating component array $210_2$. The transition band size is a function of the Gaussian mode size in the dispersion direction, and the spatial dispersion (i.e., the transition band is constrained by the beam size), as well as the offset in arrays 210. The minimization of the transmission band is desirable in high spectral efficiency devices.

Figure 3:
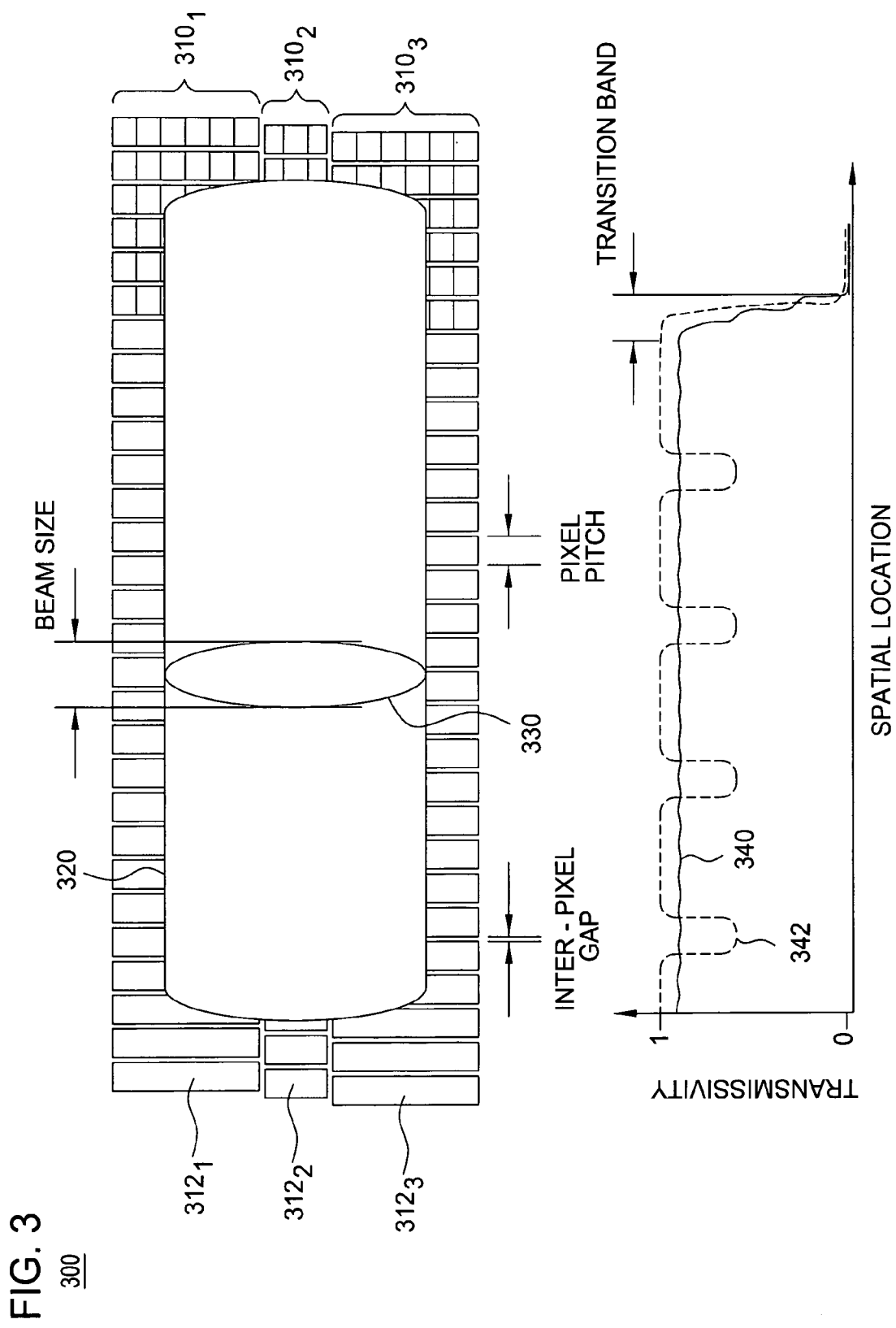
FIG. 3 depicts a spatial light modulator according to one embodiment of the invention.

FIG. 3 depicts a spatial light modulator according to one embodiment of the invention. Specifically, spatial light modulator 300 of FIG. 3 includes a plurality of modulating component arrays $310_1$–$310_3$ (collectively, modulating component arrays 310). The modulating component array $310_1$ (denoted as first modulating component array $310_1$) includes a plurality of modulating components $312_1$ (collectively, modulating components $312_1$). The modulating component array $310_2$ (denoted as second modulating component array $310_2$) includes a plurality of modulating components $312_2$ (collectively, modulating components $312_2$). The modulating component array $310_3$ (denoted as third modulating component array $310_3$) includes a plurality of modulating components $312_3$ (collectively, modulating components $312_3$). The modulating components $312_1$–$212_3$ are collectively denoted as modulating components 312.

As depicted in FIG. 3, a spatially dispersed optical signal 320 is incident upon spatial light modulator 300 such that the dispersed optical spectrum is stretched across a portion of the modulating components 312 of modulating component arrays 310. The dispersion of an optical signal for forming a spatially dispersed optical signal is generally known in the art. In one embodiment, spatial dispersion of an optical signal may be performed using a pair of lenses and a diffraction grating. For example, a received optical signal radiating from an input optical fiber may be collimated by a first lens. In continuation of this example, the collimated optical signal may be incident on a diffraction grating that spatially disperses the received optical signal. The spatially dispersed optical signal may then be directed, using a second lens, such that the dispersed optical signal is incident on a spatial light modulator.

As depicted in FIG. 3, a single-frequency component 330 of spatially dispersed optical signal 320 is incident upon spatial light modulator 300. For any single-frequency component in an optical signal spectrum, the light beam has an elliptical Gaussian shape and a finite size. As depicted in FIG. 3, single-frequency optical signal 330 of spatially dispersed optical signal 320 has an associated beam size. The single-frequency component 330 is incident upon varying numbers of modulating components 312. Although one single-frequency component 330 of spatially dispersed optical signal 320 is depicted, additional single-frequency optical signals (not depicted) of spatially dispersed optical signal 320 may be incident on other combinations of modulating components 312.

As depicted in FIG. 3, modulating components 312 are disposed along the dispersion direction of incident spatially dispersed optical signal 320. The modulating components 312 in modulating component arrays 310 have component pitches, the component pitches being defined as width in the dispersion direction. As depicted in FIG. 3, in one embodiment, the component pitches associated with each of the modulating components 312 are equal to or less than a beam size of a single-frequency component 330 of spatially dispersed optical signal 320. As depicted in FIG. 3, adjacent modulating components in each of the respective modulating component arrays 310 are separated by inter-component gaps.

As depicted in FIG. 3, the first modulating component array $310_1$ and second modulating component array $310_2$ are offset in the dispersion direction of spatially dispersed optical signal 320 such that the inter-component gaps between modulating components $312_1$ of first modulating component array $310_1$ and the inter-component gaps between modulating components $312_2$ of second modulating component array $310_2$ are offset by a fraction of component pitch. Similarly, the second modulating component array $310_2$ and third modulating component array $310_3$ are offset in the dispersion direction of spatially dispersed optical signal 320 such that the inter-component gaps between modulating components $312_2$ of second modulating component array $310_2$ and the inter-component gaps between modulating components $312_3$ of third modulating component array $310_3$ are offset by a fraction of component pitch. In one embodiment, modulating components of different arrays are offset by a fraction (e.g., one third) of the component pitch.

In accordance with the present invention, spatially dispersed optical signal 320 being incident on spatial light modulator 300 produces a resulting modulated transmission spectrum 340. The modulated transmission spectrum 340 depicts a spectrum in which transmission drops normally associated with existing spatial light modulators (illustratively, transmission drops depicted in modulated transmission spectrum 342) are reduced. In this embodiment, the Gaussian beam mode does not resolve the individual modulating components and transmission drops in the modulated transmission begin to decrease in magnitude.

As described herein, reduction of transmission drops is accompanied by a drop in the transmission level (i.e., transmissivity). In one embodiment, magnitude variations (i.e., ripple) in the modulated transmission spectrum may be reduced by increasing the number of modulating component arrays; however, as the number of modulating component arrays (and, therefore, the passband ripple) is increased, the associated transmission level is reduced. As such, selection of the number of modulating component arrays in accordance with the present invention requires balancing between reduction of transmission drops in the modulated transmission spectrum and reduction of transmissivity of the modulated transmission spectrum.

As depicted in FIG. 3, modulated transmission spectrum 340 is represented according to spatial location (illustratively, on the abscissa) and transmissivity (illustratively, on the ordinate axis). Although the transmissivity of modulated transmission spectrum 340 is less than the transmissivity of modulated transmission spectrum 342, the significant reduction of the transmission drops associated with modulated transmission spectrum 342 significantly outweighs the insignificant reduction in transmissivity (which may be on the order of a one decibel decrease). As such, the present invention enables more efficient optical bandwidth allocation, reduced transmission penalties, and the like.

As depicted in FIG. 3, an activated modulating component is denoted by horizontal hatch lines (illustratively, six rightmost modulating components 312 of each modulating component array 310). The modulated transmission spectrum 340 shows that the transmission spectrum drops significantly for an activated pixel (i.e., the transmission spectrum drops from a high transmission value to a low transmission value over finite bandwidth denoted as a transition band). As depicted in FIG. 3, the transition band associated with modulated transmission spectrum 340 includes two transition points (illustratively, transition points $344_1$ and $344_2$) due to offset positions between modulating components $312_1$ in the first modulating component array $310_1$ and the modulating components $312_2$ in second modulating component array $310_2$, and offset positions between modulating components $312_2$ in the second modulating component array $310_2$ and the modulating components $312_3$ in third modulating component array $310_3$, respectively. The transition band size is a function of the Gaussian mode size in the dispersion direction and the spatial dispersion (i.e., the transition band is constrained by the beam size). The minimization of the transmission band is desirable in high spectral efficiency devices. In one embodiment, the incident optical power of each one-dimensional modulating component array is equal (therefore, the height of each modulating component array is different).

In accordance with the present invention, using a plurality of modulating component arrays in which modulating components associated with adjacent modulating component arrays are offset in the dispersion direction of an incident optical signal reduces transmission spectrum loss resulting from inter-component gaps (since the inter-component gaps do not extend the full beam height of the spatial light modulator, but, rather, extend a portion of the height of the spatial light modulator, e.g., one half for two modulating component arrays, smaller fraction for three modulating component arrays, and the like). Furthermore, increasing the number of modulating component arrays increases the number of inter-component gaps in order to decrease the size of the inter-component gaps. As such, the greater frequency with which the partial-gaps (e.g., half-gaps, third-gaps, quarter-gaps, and so on) occur enables a reduction of the transmission dips in a transmission spectrum that typically result from inter-component gaps.

Although described herein with respect to spatial light modulators having two modulating component arrays and three modulating component arrays, the present invention may be implemented using greater numbers of modulating component arrays. Furthermore, although described with respect to modulating components having equal incident power, in one embodiment, modulating component length may vary across modulating component arrays. For example, the length of the modulating components in the middle array may be half the length of the modulating components of the end modulating component arrays. In one embodiment, adjacent ones of the plurality of modulating component arrays are offset in the direction of the modulating component arrays.

Although described herein with respect to multiple one-dimensional modulating component arrays of modulating components of specific shapes, sizes, pitches, and associated inter-component gap shapes, sizes, and contours, those skilled in the art will appreciate that multiple one-dimensional modulating component arrays of modulating components having various other shapes, sizes, pitches, and associated inter-component gap shapes, sizes, and contours may be used in accordance with the present invention. Specifically, although described herein with respect to multiple one-dimensional modulating component arrays having modulating components with component pitches less than or equal to a beam size associated with single-frequency components of incident optical signals, those skilled in the art will appreciate various other component pitches may be used in accordance with the present invention.

As described herein, the modulating components of a multiple one-dimensional modulating component array in accordance with the present invention may be adapted for achieving various results. In one embodiment, a portion of the plurality of modulating components in each modulating component array adapts an incident, spatially dispersed optical signal for smoothing a transmission spectrum of the spatially dispersed optical signal. In one embodiment, a portion of the plurality of modulating components in each modulating component array blocks a portion of the spatially dispersed optical signal. In one embodiment, a plurality of modulating components in the plurality of modulating component arrays is adapted for switching the incident optical signal. In one embodiment, a plurality of modulating components in the plurality of modulating component arrays are adapted for reducing a transition band associated with a transmission spectrum of the spatially dispersed optical signal, the transition band passing through a plurality of transmissivity states while dropping from an initial transmissivity state (e.g., transmissivity substantially close to one) to a final transmissivity state (e.g., transmissivity substantially close to zero).

Although various embodiments which incorporate the teachings of the present invention have been shown and described in detail herein, those skilled in the art can readily devise many other varied embodiments that still incorporate these teachings.

What is claimed is:

1. An apparatus, comprising:
a modulating mechanism comprising a plurality of one-dimensional modulating component arrays, each one-dimensional modulating component array comprising a plurality of modulating components, each modulating component having a pitch; wherein
adjacent ones of the plurality of modulating components in each one-dimensional modulating component array are separated by gaps; and
adjacent ones of the plurality of one-dimensional modulating component arrays are adjacent in a direction normal to a dispersion direction, the adjacent ones of the plurality of one-dimensional modulating component arrays being offset in the dispersion direction by a fraction of the pitch such that the gaps are offset.

2. The apparatus of claim 1, wherein each gap is normal to a dispersion direction of an incident optical signal.

3. The apparatus of claim 1, wherein the fraction of the pitch is determined according to a number of one-dimensional modulating component arrays in the plurality of modulating component arrays.

4. The apparatus of claim 1, further comprising:
a light dispersing mechanism, the light dispersing mechanism spatially dispersing a received optical signal onto the modulating mechanism in a direction parallel to the one-dimensional modulating component arrays.

5. The apparatus of claim 4, wherein the spatially dispersed optical signal is incident on at least a portion of the modulating components in each of the one-dimensional modulating component arrays.

6. The apparatus of claim 5, wherein a portion of the modulating components in each of the one-dimensional modulating component arrays is adapted for reducing an extent of transmission drops in a transmission spectrum of the incident optical signal.

7. The apparatus of claim 5, wherein a portion of the modulating components in each of the one-dimensional modulating component arrays is adapted for dynamically allocating optical bandwidth.

8. The apparatus of claim 5, wherein a portion of the modulating components in each of the one-dimensional modulating component arrays is adapted for performing wavelength selective switching.

9. The apparatus of claim 5, wherein a portion of the modulating components in each of the one-dimensional modulating component arrays is adapted for reducing a transition band associated with a transmission spectrum of the incident optical signal, the transition band comprising bandwidth over which the transmission spectrum changes from an initial transmissivity state to a final transmissivity state, the transition band comprising at least one other transmissivity state between the initial and final transmissivity states.

10. The apparatus of claim 1, wherein the plurality of one-dimensional modulating component arrays is adapted such that an optical power of an incident optical signal spectrum is distributed substantially equally across each of the one-dimensional modulating component arrays.

11. An apparatus, comprising:
a modulating mechanism comprising a plurality of one-dimensional modulating component arrays, each array comprising a plurality of modulating components; wherein
adjacent ones of the plurality of modulating components in each one-dimensional modulating component array are separated by gaps, each gap normal to a dispersion direction of an incident optical signal; and
adjacent ones of the plurality of one-dimensional modulating component arrays are offset along the dispersion direction such that the gaps are offset.

12. The apparatus of claim 11, wherein the gaps are offset by an offset distance.

13. The apparatus of claim 12, wherein the offset distance is determined according to a pitch of each modulating component and a number of one-dimensional modulating component arrays in the plurality of one-dimensional modulating component arrays.

14. The apparatus of claim 13, wherein the modulating mechanism comprises two one-dimensional modulating component arrays, wherein the offset distance is one half of the pitch.

15. The apparatus of claim 11, further comprising:
a light dispersing mechanism, the light dispersing mechanism spatially dispersing a received optical onto the modulating mechanism in a direction parallel to the one-dimensional modulating component arrays.

16. The apparatus of claim 11, wherein a portion of the modulating components in each of the one-dimensional modulating component arrays is adapted for dynamically allocating optical bandwidth.

17. The apparatus of claim 11, wherein a portion of the modulating components in each of the one-dimensional modulating component arrays is adapted for performing wavelength selective switching.

18. The apparatus of claim 11, wherein a portion of the modulating components in each of the one-dimensional modulating component arrays is adapted for blocking a portion of the incident optical signal.

19. The apparatus of claim 18, wherein a portion of the modulating components in each of the one-dimensional modulating component arrays are adapted for reducing a transition band associated with a transmission spectrum of the incident optical signal, the transition band comprising bandwidth over which the transmission spectrum changes from an initial transmissivity state to a final transmissivity state.

20. An apparatus, comprising:
a modulating mechanism comprising a plurality of modulating components, each modulating component comprising a plurality of modulating elements, adjacent ones of the modulating elements in each modulating component arranged along a line and being separated by gaps;
wherein adjacent ones of the modulating components are adjacent in a direction normal to a dispersion direction of an incident optical signal;
wherein the adjacent ones of the modulating components are offset for offsetting the gaps between the adjacent ones of the modulating elements in a direction parallel to the dispersion direction.

* * * * *